K. L. MÜLLER.
SPRAYING NOZZLE.
APPLICATION FILED JULY 23, 1908.
964,445.
Patented July 12, 1910.
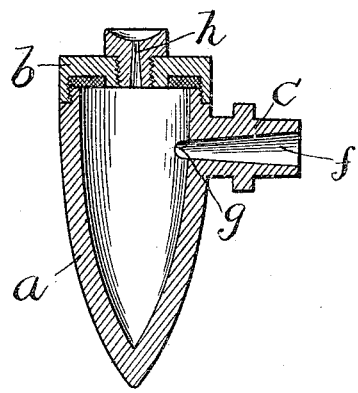
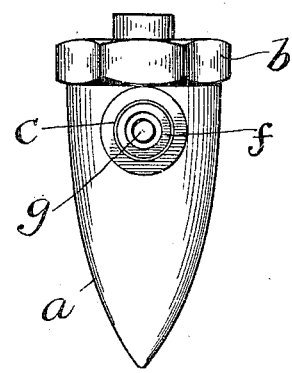

UNITED STATES PATENT OFFICE.

KARL LOUIS MÜLLER, OF STUTTGART, GERMANY, ASSIGNOR TO FIRM PAUL LECHLER, OF STUTTGART, GERMANY.

SPRAYING-NOZZLE.

964,445.  Specification of Letters Patent.  Patented July 12, 1910.

Application filed July 23, 1908. Serial No. 445,007.

*To all whom it may concern:*

Be it known that I, KARL LOUIS MÜLLER, a citizen of the German Empire, residing at Stuttgart, in the Kingdom of Würtemberg, Empire of Germany, have invented certain new and useful Improvements in Spraying-Nozzles; and I do hereby declare the following to be a full, clear, and exact description of the invention, such as will enable others skilled in the art to which it appertains to make and use the same.

My invention relates to spraying nozzles, and particularly to those to be employed in air passages in which the air current has to meet with as little resistance as possible, such for instance as in air moistening pipes, dust absorption pipes, and so forth, their cases or boxes are preferably closed on the side opposite the outlet aperture and a torpedo-shaped form is given to them.

The invention will now be more particularly described in connection with the form of construction shown in the accompanying drawings, in which:—

Figure 1 is an axial section; and Fig. 2 a front view of the nozzle.

The spraying nozzle in accordance with this invention consists of the ordinary spraying drum $a$ which is closed by a washered nut $b$ screwed thereon and is provided with an inlet socket or neck $c$ through which the water is conveyed to the spraying drum $a$. Now in order to introduce the water therein tangentially, a tangentially arranged passage $g$ is provided, whereby the water is caused to assume a circular movement. Now by this invention the admission aperture $f$ to the tangential passage $g$ is enlarged funnel-wise after the manner of a hose pipe or radiating pipe, so that the total pressure comes into play. By this arrangement of having the admission aperture to the tangential passage enlarged funnel-wise, a considerable advantage is secured when the supply pressure is low. The whole body of water practically reaches the admission aperture, without friction, and then is admitted with its full speed into the spraying nozzle. The water then passes finely sprayed through a fine aperture $h$, out of a nozzle in the lid $b$ of the spraying drum $a$. This nozzle is especially adapted for air moistening apparatus, dust absorption pipes and the like, and more particularly for air pipes in which the resistance produced by it must be as small as possible, and therefore the drum $a'$ is pointed in the shape of a torpedo on the side opposite the aperture $h$.

I declare that what I claim is:—

In a spraying nozzle, a drum having an outlet aperture and closed on the side opposite the outlet aperture and pointed in a torpedo form, the lid or cover which is placed on the outlet side, being made flush with the drum.

In testimony whereof I affix my signature, in presence of two witnesses.

KARL LOUIS MÜLLER.

Witnesses:
  JEAN GULDEN,
  HERM. HOPPE.